US009692251B2

(12) United States Patent
Sever et al.

(10) Patent No.: US 9,692,251 B2
(45) Date of Patent: Jun. 27, 2017

(54) APPARATUS, SYSTEM AND METHOD OF WIRELESS POWER TRANSFER

(71) Applicant: Intel Corporation, Santa Clara, CA (US)

(72) Inventors: Isaac Sever, Beaverton, OR (US); Songnan Yang, San Jose, CA (US); Siva Ramakrishnan, Beaverton, OR (US); Karim H. Tadros, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 264 days.

(21) Appl. No.: 14/323,689

(22) Filed: Jul. 3, 2014

(65) Prior Publication Data

US 2016/0006289 A1      Jan. 7, 2016

(51) Int. Cl.
| | |
|---|---|
| *H02J 7/00* | (2006.01) |
| *H02J 7/14* | (2006.01) |
| *H02J 7/02* | (2016.01) |
| *H02J 50/12* | (2016.01) |
| *H02J 50/80* | (2016.01) |
| *B60L 11/18* | (2006.01) |

(52) U.S. Cl.
CPC ............ *H02J 7/025* (2013.01); *H02J 50/12* (2016.02); *H02J 50/80* (2016.02); *B60L 11/182* (2013.01); *H02J 7/0016* (2013.01)

(58) Field of Classification Search
USPC ....... 320/108, 107, 109, 137, 139, 122, 140, 320/141, 148, 149; 307/104
See application file for complete search history.

(56) References Cited

U.S. PATENT DOCUMENTS

| | | |
|---|---|---|
| 2009/0167260 A1 | 7/2009 | Pauritsch et al. |
| 2010/0013321 A1 | 1/2010 | Onishi et al. |
| 2012/0077551 A1 | 3/2012 | Balteanu et al. |
| 2012/0242284 A1* | 9/2012 | Wheatley, III .......... H02J 17/00 320/108 |
| 2012/0242884 A1 | 9/2012 | Ishiguro et al. |
| 2013/0009470 A1 | 1/2013 | Chuang et al. |
| 2013/0234658 A1 | 9/2013 | Endo et al. |
| 2013/0307471 A1* | 11/2013 | Ichikawa ................ H02J 7/007 320/108 |

(Continued)

OTHER PUBLICATIONS

International Search Report and Written Opinion for International Patent Application No. PCT/US2015/033440, mailed on Aug. 24, 2015, 11 pages.

(Continued)

*Primary Examiner* — Alexis A Boateng
(74) *Attorney, Agent, or Firm* — Shichrur & Co.

(57) ABSTRACT

Some demonstrative embodiments include apparatuses, systems and/or methods of wireless power transfer. For example, a Wireless Power Receiver (WPR) may include a rectifier to convert a wireless charging signal received from Wireless Power Transmitter (WPT into a Direct Current (DC) power signal; a voltage regulator to regulate a voltage of the DC power signal according to a voltage range; a bypass path to bypass the voltage regulator; and a bypass controller to select between directing the DC power signal to the voltage regulator or to the bypass path, based on a voltage level of the DC power signal and the voltage range.

25 Claims, 4 Drawing Sheets

(56) References Cited

U.S. PATENT DOCUMENTS

| | | | | |
|---|---|---|---|---|
| 2014/0015336 A1* | 1/2014 | Weber | ................... | H01F 38/14 |
| | | | | 307/104 |
| 2014/0103869 A1* | 4/2014 | Radovic | ............... | H04B 5/0037 |
| | | | | 320/108 |
| 2014/0152248 A1* | 6/2014 | Yeh | ................... | H02J 7/025 |
| | | | | 320/108 |
| 2014/0184154 A1* | 7/2014 | Okazaki | ................. | H02J 7/025 |
| | | | | 320/108 |
| 2015/0123602 A1* | 5/2015 | Patino | ................... | H02J 17/00 |
| | | | | 320/108 |
| 2016/0020634 A1* | 1/2016 | Kanno | ................... | H02J 17/00 |
| | | | | 320/108 |

OTHER PUBLICATIONS

Alliance for Wireless Power, A4WP Wireless Power Transfer System Baseline System Specification (BSS), Ver. 1.1.2 +, Nov. 14, 2013, 98 pages.

System Description, Wireless Power Transfer, vol. I: Low Power, Part 1: Interface Definition, Version 1.1.1, Jul. 2012, 247 pages.

Office Action for Taiwanese Patent Application No. 104117795, mailed on Dec. 15, 2016, 10 pages (Including 1 page of English translation).

International Preliminary Report on Patentability for PCT /US2015/ 033440, mailed on Jan. 12, 2017, 10 pages.

\* cited by examiner

APPARATUS, SYSTEM AND METHOD OF WIRELESS POWER TRANSFER

TECHNICAL FIELD

Some demonstrative embodiments relate to wireless power transfer.

BACKGROUND

Wireless technology continues to evolve, and with it so does the wide array of devices available in the marketplace. Further to emerging cellular handsets and Smartphones that have become integral to the lives of consumers, existing applications not traditionally equipped with any means to communicate are becoming wirelessly enabled. For example, various industrial, commercial and/or residential systems may employ wireless communication for the purposes of monitoring, medical, reporting, control, etc.

As the application of wireless communication expands, the powering of wireless devices may become a concern. This concern falls mainly in the realm of mobile communication devices wherein the expanding applicability of wireless communication implies a corresponding increase in power consumption. One way, in which the power problem may be addressed is by increasing battery size and/or device efficiency. Development in both of these areas continues, but may be impeded by the desire to control wireless device size, cost, etc.

Another manner by which mobile wireless device power consumption may be addressed is by facilitating easier recharging of devices. In existing systems, battery-driven devices must be periodically coupled to another power source, e.g., grid power, solar power, fuel cell, and the like, for recharging. Typically this involves maintaining a recharger specific to the device being charged, and mechanically coupling the device to a charging cord for some period of time.

Developments in the area of recharging are being developed to replace this cumbersome process. For example, wireless charging may remove the requirement of having charging equipment corresponding to a particular device to be charged.

Wireless power transfer has the potential to transform electronics by "cutting the last cord," freeing users from the need to plug in to recharge devices, and changing the design space, for example, by enabling devices with no connectors.

End to end power transfer efficiency of a wireless power receiver is a key performance indicator of the wireless power receiver. The end-to-end power transfer efficiency is based on an efficiency of each power conversion and/or transfer stage of the wireless power receiver.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
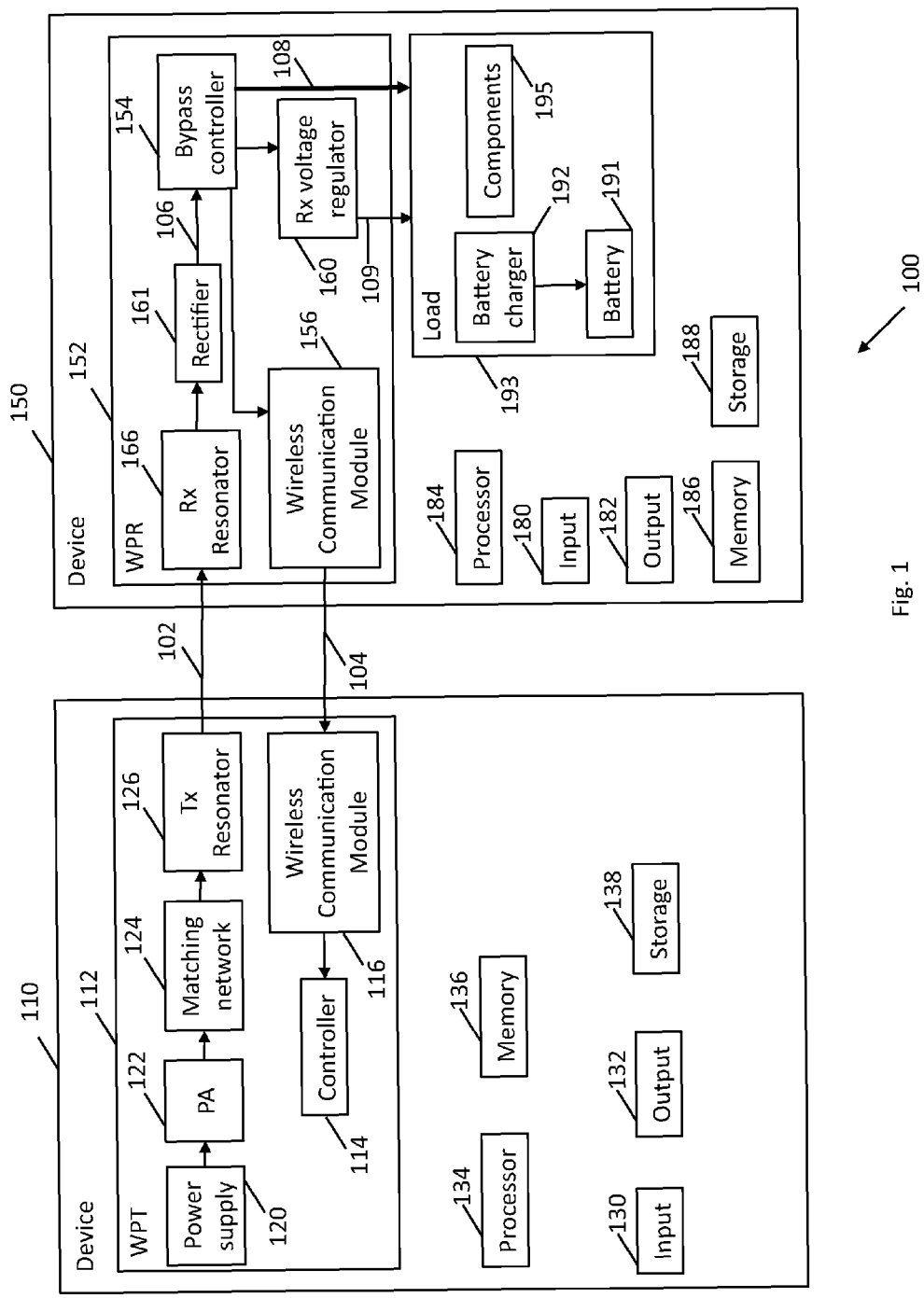
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a peripheral device, a Personal Digital Assistant (PDA) device, a handheld PDA device, a wireless chargeable device, a wireless charging device, an on-board device, an off-board device, a hybrid device, a vehicular device, a non-vehicular device, a mobile or portable device, a consumer device, a non-mobile or non-portable device, a wireless communication station, a wireless communication device, a video device, an audio device, an audio-video (A/V) device, a peripheral device, and the like.

Some embodiments may be used in conjunction with devices and/or systems operating in accordance with existing Alliance for Wireless Power (A4WP) Specifications (*A4WP Wireless Power Transfer System Baseline System Specification* (*BSS*) *Proposal* Version 1.0.4, march 6, 2013) and/or future versions and/or derivatives thereof, devices and/or systems operating in accordance with existing Wireless Power Consortium (WPC) Specifications (including "*System Description, Wireless Power Transfer, Volume I: Low Power, Part 1: Interface Definition*, Version 1.1.1, July 2012") and/or future versions and/or derivatives thereof, devices and/or systems operating in accordance with existing Power Matters Alliance (PMA) Specifications and/or future versions and/or derivatives thereof, devices and/or networks operating in accordance with wireless charging Specifications, devices and/or networks operating in accordance with resonant wireless charging Specifications, devices and/or networks operating in accordance with inductive wireless charging Specifications, wireless transfer Specifications, units and/or devices which are part of the above systems, and the like.

The phrase "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The phrases "wireless power signal" and "wireless charging signal", as used herein, include, for example, a transmission of electric power from a first device (also referred to as "power transmitter", "Wireless Power Transmitter (WPT)" or "Power Transmitter Unit (PTU)") to at least one second device (also referred to as "power receiver", "Wireless Power Receiver (WPR)" or "Power Receiver Unit (PRU)"), via a wireless medium, e.g., without using an electric cable or wire to transfer the electric power between the power transmitter and power receiver. In one example, the wireless power signal may be in the form of a magnetic field, which may configured to induce electric current at the power receiver. Alternatively, the wireless power signal may include any other form of transferring power from the power transmitter to the power receiver.

Some demonstrative embodiments may be implemented by wireless charging devices and/or systems, e.g., as described below. Other embodiments may be implemented for any other type of power delivery, e.g., energy harvesting.

Some demonstrative embodiments may be implemented by resonant wireless charging devices and/or systems, e.g., as described below. Other embodiments may be implemented for any other type of wireless charging, e.g., inductive wireless charging.

Reference is now made to FIG. 1, which schematically illustrates a system 100, in accordance with some demonstrative embodiments.

As shown in FIG. 1, in some demonstrative embodiments, system 100 may include at least one device 110 ("charging device") configured to transmit at least one wireless charging signal 102 to be received by at least one device 150 ("chargeable device"), e.g., to charge device 150, as described below.

Although in some embodiments, as shown in FIG. 1, device 110 may transmit wireless charging signal 102 to one chargeable device, in other embodiments, device 110 may transmit wireless charging signal 102 to be received by a plurality of chargeable devices.

In some demonstrative embodiments, device 110 may include a Wireless Power Transmitter (WPT) 112, configured to transmit wireless charging signal 102.

In some demonstrative embodiments, device 150 may include a Wireless Power Receiver (WPR) 152, configured to receive wireless charging signal 102.

In some demonstrative embodiments, WPR 152 may be configured to provide power to at least one device load 193 of device 150.

In some demonstrative embodiments, device 150 may be a battery-powered device.

In one example, load 193 may include a battery 191 of device 150. For example, WPR 152 may be configured to provide power to charge battery 191.

In some demonstrative embodiments, load 193 may include a battery charger 192 to charge battery 191. For example, WPR 152 may provide power to battery charger 192, and battery charger 192 may charge battery 191.

For example, device 150 may include a mobile phone, a Smartphone, a watch, a mobile computer, a laptop computer, a tablet computer, an Ultrabook™ computer, a notebook computer, a video device, a display device, a handheld computer, a handheld device, a PDA device, a handheld PDA device, a hybrid device (e.g., combining cellular phone functionalities with PDA device functionalities), a consumer device, a vehicular device, a non-vehicular device, a mobile or portable device, a cellular telephone, a Personal Communication Systems (PCS) device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, an audio device, an A/V device, a Personal Media Player (PMP), a digital video camera (DVC), a digital audio player, a Digital Still camera (DSC), a media player, a music player, or the like.

In other embodiments, device 150 may include a device, e.g., a peripheral device, which may be configured to directly consume the power received from device 110.

In one example, load 193 may include one or more components 195 of device 150, which may be configured to utilize the power provided by WPR 152. For example, WPR 152 may be configured to provide power to be consumed by one or more components 195.

For example, device 150 may include a wireless mouse, a wireless keyboard, a wireless storage device, a wireless sensor device, a wireless audio device, a wireless speaker device, a wireless microphone, a wireless joystick, a trackball, a remote control, and the like.

In some demonstrative embodiments, device 110 may include a non-mobile device, for example, a PC, a desktop computer, a dedicated charger device, a vehicular device, a car charger, an on-board device, an off-board device, a consumer device, a video device, an audio device, an A/V device, or the like.

In other embodiments, device 110 may include a mobile device, for example, a mobile charger, a charger pad, a charger plate, a charger board, a charger cover, a charger mat, a charging case, a charging sleeve, a mobile phone, a Smartphone, a watch, a mobile computer, a laptop computer, a tablet computer, an Ultrabook™ computer, a notebook computer, a video device, a display device, a handheld computer, a handheld device, a PDA device, a handheld PDA device, a hybrid device, a consumer device, a vehicular device, a non-vehicular device, a mobile or portable device, a cellular telephone, a PCS device, a PDA device which incorporates a wireless communication device, a mobile or portable GPS device, a relatively small computing device, a non-desktop computer, a CSLL device, a UMD, an UMPC, an MID, an "Origami" device or computing device, an audio device, an A/V device, a PMP, a DVC, a digital audio player, a DSC, a media player, a music player, or the like.

In one example, device 110 may include a first mobile device, for example, a mobile computer, e.g., an Ultrabook™ computer, a laptop computer or a notebook computer; and device 150 may include a second mobile device, e.g., a mobile phone, another mobile computer, and the like.

In another example, device 110 may include a mobile computer, e.g., an Ultrabook™ computer, a laptop computer, a notebook computer, and device 150 may include a peripheral of the mobile computer, e.g., a wireless keyboard, a wireless mouse, a wireless storage device, a wireless sensor device, a wireless audio device, a wireless microphone, a wireless speaker, a wireless joystick, and the like.

In another example, device 110 may include a stationary device, e.g., PC or a desktop computer, and device 150 may include a peripheral of the stationary device, e.g., a wireless keyboard, a wireless mouse, a wireless microphone, a wireless speaker, a wireless joystick, and the like; or a mobile device to be charged by the stationary device, e.g., a mobile phone, a mobile computer, and the like.

In other embodiments, devices 110 and/or 150 may include any other combination of mobile or non-mobile devices.

In some demonstrative embodiments, device 110 may include, for example, one or more of a processor 134, an input unit 130, an output unit 132, a memory unit 136, and/or a storage unit 138. Device 150 may include, for example, one or more of a processor 184, an input unit 180, an output unit 182, a memory unit 186, and/or a storage unit 188. Devices 110 and/or 150 may optionally include other suitable hardware components and/or software components. In some demonstrative embodiments, some or all of the components of device 110 and/or device 150 may be enclosed in a common housing or packaging, and may be interconnected or operably associated using one or more wired or wireless links. In other embodiments, components devices 110 and/or 150 may be distributed among multiple or separate devices.

Processor 134 and/or processor 184 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 134 may execute instructions, for example, of an Operating System (OS) of device 110 and/or of one or more suitable applications; and/or processor 184 may execute instructions, for example, of an OS of device 150 and/or of one or more suitable applications.

Input unit 130 and/or input unit 180 includes, for example, a keyboard, a keypad, a mouse, a touch-screen, a touch-pad, a track-ball, a stylus, a microphone, or other suitable pointing device or input device. Output unit 132 and/or output unit 182 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 136 and/or memory unit 186 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 138 and/or storage unit 188 includes, for example, a hard disk drive, a floppy disk drive, a Compact Disk (CD) drive, a CD-ROM drive, a DVD drive, or other suitable removable or non-removable storage units. Memory unit 136 and/or storage unit 138, for example, may store data processed by device 110; and/or memory unit 186 and/or storage unit 188, for example, may store data processed by device 150.

In some demonstrative embodiments, WPT 112 may include a Power Amplifier (PA) 122 to amplify power received from a power supply 120.

In one example, power supply 120 may include an internal power supply of device 110, e.g., a battery of device 110.

In another example, power supply 120 may include a wall adapter and/or a converter, e.g., a Direct Current (DC) to DC (DC2DC) converter or an Alternating Current (AC) to DC (AC2DC) converter to convert electric power received from an external power source, e.g., via a power cord or cable.

In some demonstrative embodiments, WPT 112 may include a Transmitter (Tx) resonator 126 configured to convert the electric power from PA 122 into a wireless charging signal 102, e.g., in the form of a Radio Frequency (RF) signal.

In one example, Tx resonator 126 may include a magnetic field generator capable of generating wireless charging signal 102 in response to the power provided by PA 122. For example, Tx resonator 126 may include a coil or an electrical conducting wire.

In some demonstrative embodiments, WPT 112 may include a matching network 124 to match an electric impedance between PA 122 and TX resonator 126.

In some demonstrative embodiments, matching network 124 may be configured to increase a power transfer between PA 122 and Tx resonator 126, and/or to minimize reflections from Tx resonator 126.

In some demonstrative embodiments, WPT 112 may include a wireless power controller ("controller") 114 to control one or more operations of WPT 112, for example, by controlling current provided to Tx resonator 126 to generate wireless charging signal 102.

In some demonstrative embodiments, controller 114 may control WPT 112 to transmit wireless charging signal 102.

In some demonstrative embodiments, WPR 152 may be configured to receive wireless charging signal 102, e.g., from WPT 112.

In some demonstrative embodiments, WPR 152 may include a Receiver (Rx) resonator 166 configured to receive wireless charging signal 102 from WPT 112. For example, Rx resonator 166 may include a coil.

In some demonstrative embodiments, WPR 152 may include a rectifier 161 configured to convert wireless charging signal 102 into a DC power signal 106. For example, rectifier 161 may include an electric circuit including a diode bridge, and/or any other electric circuit.

In some demonstrative embodiments, a voltage level of DC power signal 106 may vary, for example, due to variation of a magnetic field coupling between Tx resonator 126 and Rx resonator 166. For example, in some cases, DC power signal 106 may have a first voltage, while in other cases, DC power signal 106 may have a second voltage, which may be two or three times greater than the first voltage.

In one example, the voltage level of DC power signal 106 may vary according to a distance between WPT 112 and WPR 152. For example, the voltage level of DC power signal 106 may increase, for example, if the distance between WPT 112 and WPR 152 decreases, and the voltage level of DC power signal 106 may decrease, for example, if the distance between WPT 112 and WPR 152 increases.

In another example, the voltage level of DC power signal 106 may vary, for example, based on the configuration of WPT 112, which transmits wireless charging signal 102. For example, different WPTs may transmit wireless charging signals, which may have different power levels. For example, DC power signal 106 may have a first voltage, if wireless charging signal 102 has a first power level, and DC power signal 106 may have a second voltage, e.g., greater than the first voltage, for example, if wireless charging signal 102 has a second power level, e.g., greater than the first power level.

In some demonstrative embodiments, the voltage level of DC power signal 106 may not be within a voltage range ("load voltage range") suitable for load 193. For example, the load voltage range may include a voltage range configured to operate components 195 and/or to charge battery 191.

In some demonstrative embodiments, battery charger 192 may require a high input voltage, for example, to charge high capacity batteries, e.g., Lithium Ion (Li-Ion) batteries.

In some demonstrative embodiments, battery charger 192 may not support a wide variation of input voltages. For example, battery charger 192 may support a relatively high input voltage with a relatively narrow variation range.

In one example, battery charger 192 may include an Li-Ion battery charger, for example, if battery 191 includes an Li-Ion battery. According to this example, battery charger 192 may require a minimum input voltage of, e.g., 4 Volts (V), and may tolerate a maximum input voltage of, e.g., 6-8 (V).

In some demonstrative embodiments, the variation of the voltage level of DC power signal 106 may exceed a voltage range supported by battery charger 192.

In some demonstrative embodiments, configuring battery charger 192 to support a wide range of input voltages may result in a complex and expensive implementation of battery charger 192, and/or may not enable using conventional and/or low-cost battery charger components.

In some demonstrative embodiments, configuring WPT 112 to limit the variation of the magnetic field coupling between Tx resonator 126 and Rx resonator 166, may enable to limit the variation of the voltage level of DC power signal 106, e.g., to conform to the voltage requirements of load 193 and/or battery charger 192. However, in such case, WPR 152 may not be able to handle wireless charging signals from other WPTs, which may not be configured to limit the variation of the magnetic field coupling between Tx resonator 126 and Rx resonator 166.

In some demonstrative embodiments, WPR 152 may include an Rx voltage regulator 160 configured to regulate the voltage level of DC power signal 106, and to convert DC power signal 106 into a regulated DC power signal 109 according to the load voltage range.

In some demonstrative embodiments, regulated DC power signal 109 may be within a voltage range ("regulator voltage range"), which may be based on the load voltage range.

In some demonstrative embodiments, the regulator voltage range may be equal to the load voltage range. In other embodiments, the regulator voltage range may be narrower or wider than the load voltage range.

In some demonstrative embodiments, Rx voltage regulator 160 may be configured to dynamically update the regulator voltage range, e.g., based on load 193.

For example, Rx voltage regulator 160 may dynamically update the regulator voltage range to a first voltage range, for example, if load 193 includes a first load, e.g., if load 193 includes battery 191. Rx voltage regulator 160 may dynamically update the regulator voltage range to a second voltage range, e.g., narrower than the first voltage range, for example, if load 193 includes a second load, e.g., if load 193 includes battery 191 and components 195.

In one example, Rx voltage regulator 160 may dynamically reduce an upper voltage limit of the regulator voltage range, e.g., if load 193 includes a relatively high load, for example, to leave margin for changes in the regulator voltage range due to changes in load 193.

In some demonstrative embodiments, WPR 152 may be configured to provide regulated DC power signal 109 to load 193.

In some demonstrative embodiments, an efficiency of WPR 152 may be based on a ratio between an output power of WPR 152, e.g., regulated DC power signal 109, and an input power of WPR 152, e.g., wireless charging signal 102.

In some demonstrative embodiments, the efficiency of WPR 152 may be based on the efficiency of one or more elements of WPR 152 between Rx resonator 166 and battery 191. For example, the efficiency of WPR 152 may be based on an efficiency of rectifier 161, an efficiency of Rx voltage regulator 160, and/or an efficiency of battery charger 192.

In some demonstrative embodiments, the efficiency of WPR 152 may be calculated by multiplying the efficiencies of rectifier 161, Rx voltage regulator 160 and battery charger 192.

In one example, the efficiency of rectifier 161 may be 90%, the efficiency of Rx voltage regulator 160 may be 90%, and/or the efficiency of battery charger 192 may be 85%. According to this example, the efficiency of WPR 152 may be equal to 68.85%. According to this example, a thermal loss of WPR 152 may be equal to 45%.

Some demonstrative embodiments may be configured to increase the efficiency of WPR 152 and/or to reduce the thermal loss of WPR 152, e.g., as described below.

In some demonstrative embodiments, WPR 152 may be configured to dynamically bypass one or more elements of WPR 152, which convert wireless charging signal 102, and/or affect the efficiency of WPR 152.

In some demonstrative embodiments, in some cases, the voltage level of DC power signal 106 may not be within the regulator voltage range. In such cases, Rx voltage regulator 160 may regulate DC power signal 106, e.g., to convert DC power signal 106 into regulated DC power signal 109. In other cases, the voltage level of DC power signal 106 may be within the regulator voltage range. Accordingly, Rx voltage regulator 160 may not be needed to regulate DC power signal 106.

In some demonstrative embodiments, WPR 152 may be configured to dynamically bypass Rx voltage regulator 160, for example, based on the voltage level of DC power signal 106.

In some demonstrative embodiments, the efficiency of WPR 152 may increase, and/or a thermal dissipation of WPR 152 may decrease, for example, if WPR 152 bypasses Rx voltage regulator 160.

For example, the efficiency of WPR 152, if Rx voltage regulator 160 is bypassed, may be based on the efficiency of rectifier 161 and the efficiency of battery charger 192. For example, if Rx voltage regulator 160 is bypassed, the efficiency of WPR 152 may be equal to 76.5%, e.g., if the efficiency of rectifier 161 is 90%, and the efficiency of battery charger 192 is 85%. Therefore, bypassing Rx voltage regulator 160 may improve the efficiency of WPR 152 by 7.65%.

According to this example, the thermal loss of WPR 152, for example, if Rx voltage regulator 160 is bypassed, may be equal to 30.7%. Therefore, bypassing Rx voltage regulator 160 may decrease the thermal loss of WPR 152 by 14.5%.

In some demonstrative embodiments, WPR 152 may include a bypass path 108 to bypass Rx voltage regulator 160.

For example, bypass path 108 may connect between an output of rectifier 161 and load 193, for example, to enable DC power signal 106 to bypass Rx voltage regulator 160.

In some demonstrative embodiments, WPR 152 may include a bypass controller 154 configured to select between directing DC power signal 106 to Rx voltage regulator 160 and directing DC power signal 106 to bypass path 108, e.g., as described below.

In some demonstrative embodiments, bypass controller 154 may select between directing DC power signal 106 to Rx voltage regulator 160 and directing DC power signal 106 to bypass path 108, based on the voltage level of DC power signal 106 and a voltage range, e.g., the regulator voltage range or the load voltage range.

In some demonstrative embodiments, bypass controller 154 may be configured to sense the voltage level of DC power signal 106. For example, bypass controller 154 may sense a voltage level at an output of rectifier 161, for example, to determine whether or not the voltage level of DC power signal 106 is within the regulator voltage range or the load voltage range.

In other embodiments, bypass controller 154 may be configured to sense the voltage level at an output of Rx voltage regulator 160 or at the input of load 193.

In some demonstrative embodiments, bypass controller 154 may direct DC power signal 106 to bypass path 108, for example, if the voltage level of DC power signal 106 is within the regulator voltage range.

In some demonstrative embodiments, bypass controller 154 may direct DC power signal 106 to Rx voltage regulator 160, for example, if the voltage level of DC power signal 106 is not within the regulator voltage range.

Some demonstrative embodiments may be configured to feedback to WPT 112 voltage information, corresponding to the voltage level of DC power signal 106, for example, to enable WPT 112 to adjust a power level of wireless charging signal 102, e.g., as described below.

In some demonstrative embodiments, WPR 152 may be configured to feedback the voltage information to WPT 112 via a wireless communication link between WPR 152 and WPT 112. For example, device 150 may include a wireless communication module 156 to send the voltage information, and/or device 110 may include a wireless communication module 116 to receive the voltage information.

In some demonstrative embodiments, wireless communication modules 116 and/or 156 may include Bluetooth (BT) communication modules to communicate BT signals, e.g., Ultra High Frequency (UHF) signals. For example, BT communication modules 116 and/or 156 may include Bluetooth Low Energy (BLE) communication modules.

In other embodiments, wireless communication modules 116 and/or 156 may include any other wireless communication modules, e.g., Infra-Red (IR) communication modules, Wireless Fidelity (WiFi) communication modules, millimeter wave (mmWave) communication modules, Wireless Gigabit (WiGig) communication modules, Near Field Communication (NFC) modules, and the like.

In some demonstrative embodiments, WPR 152 may be configured to feedback the voltage information to WPT 112 via load modulation of wireless charging signal 102, e.g., by controlling a load of Rx resonator 166.

In some demonstrative embodiments, bypass controller 154 may be configured to send to WPT 112 a request 104 to adjust the power of wireless charging signal 102, e.g., as described below.

In some demonstrative embodiments, adjusting the power of wireless charging signal 102 may affect the voltage level of DC power signal 106, e.g., such that the voltage level of DC power signal 106 may be within the regulator voltage range.

For example, increasing the power of wireless charging signal 102 may increase the voltage level of DC power signal 106; and/or decreasing the power of wireless charging signal 102 may decrease the voltage level of DC power signal 106.

In some demonstrative embodiments, request 104 may be based on the voltage level of DC power signal 106 and the regulator voltage range.

In some demonstrative embodiments, bypass controller 154 may send request 104 to WPT 112, for example, if the voltage level of DC power signal 106 is not within the regulator voltage range.

In some demonstrative embodiments, request 104 may include voltage information corresponding to the regulator voltage range and/or voltage information corresponding to the voltage level of DC power signal 106, e.g., as described below.

In some demonstrative embodiments, request 104 may include a request to decrease or to increase the power of wireless charging signal 102.

In some demonstrative embodiments, WPT 112 may increase or decrease the power of wireless charging signal 102 based on a predefined power-adjusting scheme.

For example, request 104 may include an indication to decrease or to increase the power of wireless charging signal 102. According to this example, WPT 112 may decrease or increase the power of wireless power signal 102 by a predefined voltage value, for example, in response to the request 104.

In some demonstrative embodiments, request 104 may include a voltage adjustment to be applied to wireless charging signal 102. For example, WPT 112 may increase or decrease wireless charging signal 102 according to the voltage adjustment value.

In some demonstrative embodiments, request 104 may include a target voltage, to which wireless charging signal 102 may be adjusted. For example, WPT 112 may increase or decrease the power of wireless charging signal 102 to the target voltage.

In some demonstrative embodiments, WPR 152 may send request 104 as part of a power management message. For example, the voltage information of request 104 may be included as part of one or more static and/or dynamic parameters of the power management message.

For example, the static and/or dynamic parameters may include the voltage level of DC power signal 106, and/or minimum and maximum voltage levels of DC power signal 106.

In some demonstrative embodiments, request 104 may include any other additional or alternative parameters. For example, request 104 may include information corresponding to a voltage of wireless charging signal 102 versus load 193, and/or the efficiency of WPR 152 versus the voltage of wireless charging signal 102.

In some demonstrative embodiments, WPR 152 may send request 104 to WPT 112 in response to a power management request message from WPT 112.

In some demonstrative embodiments, the power management request message from WPT 112 may include a request for additional parameters.

In some demonstrative embodiments, WPT 112 may receive request 104 from WPR 152.

In some demonstrative embodiments, WPT 112 may be configured to adjust wireless charging signal 102 based on request 104, for example, if WPT 112 is not charging one or more other devices in addition to device 150.

In some demonstrative embodiments, WPT 112 may not adjust wireless charging signal 102, for example, if WPT 112 charges one or more other devices in addition to device 150.

In one example, adjusting wireless charging signal 102 may affect a charging of the other devices, e.g., the adjusted wireless charging signal 102 may not be sufficient to charge the other devices.

In some demonstrative embodiments, WPT 112 may be configured to adjust wireless charging signal 102, e.g., to a level, which may enable bypass controller 154 to direct DC power signal 106 to bypass path 108.

In some demonstrative embodiments, controller 114 may adjust a current to Tx resonator 126 to decrease or increase the power of wireless charging signal 102.

In some demonstrative embodiments, WPR 152 may receive wireless charging signal 102, e.g., after being adjusted by WPT 112.

In some demonstrative embodiments, bypass controller 154 may direct DC power signal 106 to bypass Rx voltage regulator 160, for example, after wireless charging signal 102 is adjusted by WPT 112.

In some demonstrative embodiments, bypassing Rx voltage regulator 160 may increase the charge rate of WPR 152 and/or decrease a charge time of battery 191.

In some demonstrative embodiments, selecting whether to direct DC power signal 106 to bypass path 108 or to Rx voltage regulator 160 may enable to increase the efficiency of WPR 152, for example, when receiving power charging signal 102 from WPT 112.

In some demonstrative embodiments, selecting whether to direct DC power signal 106 to bypass path 108 or to Rx voltage regulator 160 may enable WPR 152 to receive wireless charging signals from other WPTs, e.g., different from WPT 112, which provide a relatively wide range of voltage levels, for example, by utilizing Rx voltage regulator 160.

Figure 2:
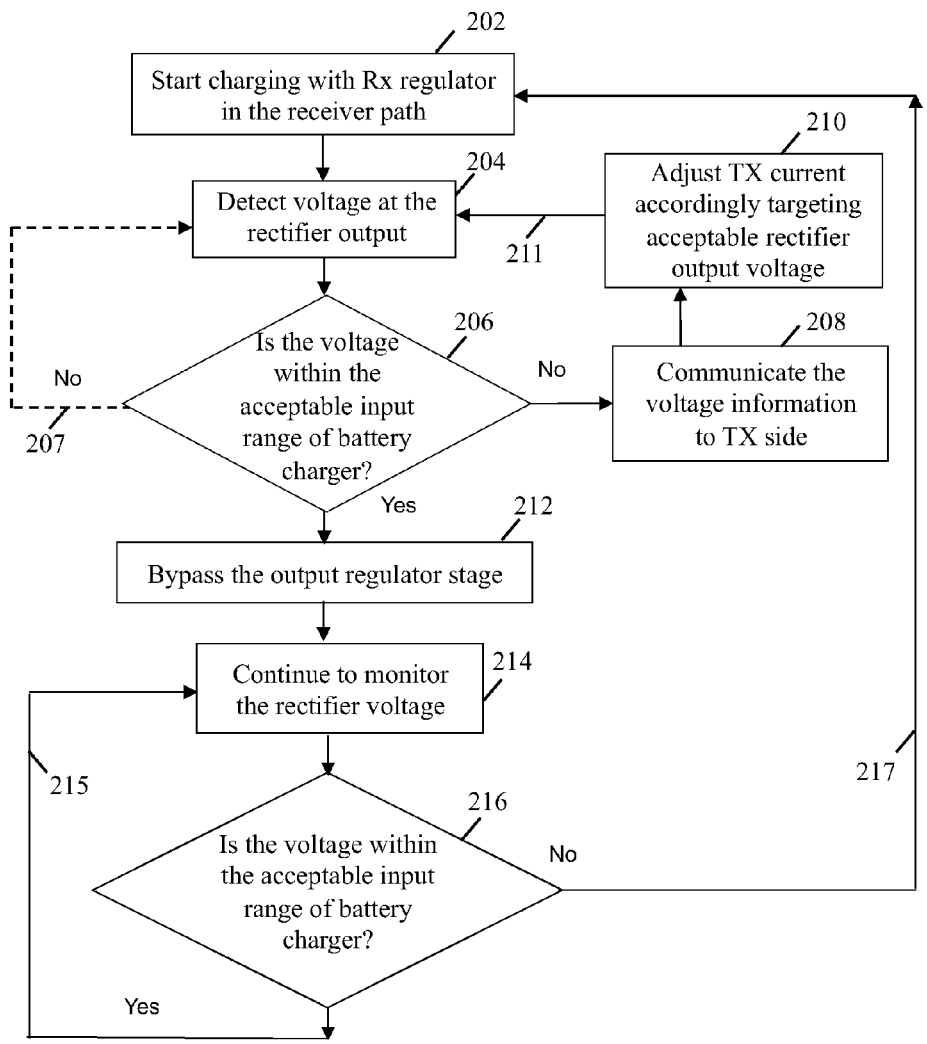
FIG. 2 is a flow-chart illustration of a method of dynamically bypassing a voltage regulator, in accordance with some demonstrative embodiments.

Reference now is made to FIG. 2, which schematically illustrates a method of bypassing a voltage regulator in a wireless power receiver, in accordance with some demonstrative embodiments. For example, one or more of the operations of the method of FIG. 2 may be performed by a wireless charging system, e.g., system 100 (FIG. 1); a charging device, e.g., device 110 (FIG. 1); a rechargeable device, e.g., device 150 (FIG. 1); a controller, e.g., controller 114 (FIG. 1); and/or a bypass controller, e.g., bypass controller 154 (FIG. 1).

As indicated at block 202, the method may include directing, at a WPR, a DC power signal to a voltage regulator. For example, bypass controller 154 (FIG. 1) may direct DC power signal 106 (FIG. 1) to Rx voltage regulator 160 (FIG. 1), e.g., as described above.

As indicated at block 204, the method may include detecting a voltage level of the DC power signal. For example, bypass controller 154 (FIG. 1) may detect the voltage level of DC power signal 106 (FIG. 1), e.g., as described above.

As indicated at block 206, the method may include determining whether or not the voltage level of the DC power signal is within a voltage range. For example, bypass controller 154 (FIG. 1) may determine whether or not the voltage level of DC power signal 106 (FIG. 1) is within the voltage range, e.g., as described above.

As indicated by arrow 207, the method may include continuing to monitor the voltage level of the DC power signal, for example, as long as the voltage level of the DC power signal is not within the voltage range. For example, bypass controller 154 (FIG. 1) may continue to monitor the voltage level of DC power signal 106 (FIG. 1), for example, as long as the voltage level of DC power signal 106 (FIG. 1) is not within the voltage range, e.g., as described above.

As indicated at block 212, the method may include directing the DC power signal to a bypass path, for example, if the voltage level of the DC power signal is within the voltage range. For example, bypass controller 154 (FIG. 1) may direct DC power signal 106 (FIG. 1) to bypass path 108 (FIG. 1), for example, if the voltage level of DC power signal 106 (FIG. 1) is within the voltage range, e.g., as described above.

As indicated at block 214, the method may include monitoring the voltage level of the DC power signal. For example, bypass controller 154 (FIG. 1) may monitor the voltage level of DC power signal 106 (FIG. 1), e.g., as described above.

As indicated at block 216, the method may include determining whether or not the voltage level of the DC power signal is within the voltage range. For example, bypass controller 154 (FIG. 1) may determine whether the voltage level of DC power signal 106 (FIG. 1) is within the voltage range, e.g., as described above.

As indicated by arrow 215, the method may include continuing to monitor the voltage level of the DC power signal, for example, as long as the voltage level of the DC power signal is within the voltage range. For example, bypass controller 154 (FIG. 1) may continue to monitor the voltage level of DC power signal 106 (FIG. 1), for example, as long as the voltage level of DC power signal 106 (FIG. 1) is within the voltage range, e.g., as described above.

As indicated by arrow 217, the method may include directing the DC power signal to the voltage regulator, for example, if the voltage level of the DC power signal is not within the voltage range. For example, bypass controller 154 (FIG. 1) may direct DC power signal 106 (FIG. 1) to Rx voltage regulator 160 (FIG. 1), for example, if the voltage level of DC power signal 106 (FIG. 1) is not within the voltage range, e.g., as described above.

In some demonstrative embodiments, the method may include communicating voltage information from the WPR to a WPT, e.g., as described below.

As indicated at block 208, the method may include sending to the wireless power transmitter a request to adjust a wireless charging signal, for example, if the voltage level of the DC power signal is not within the voltage range. For example, WPR 152 (FIG. 1) may send request 104 (FIG. 1) to WPT 112 (FIG. 1), for example, if the voltage level of DC power signal 106 (FIG. 1) is not within the voltage range, e.g., as described above.

As indicated at block 210, the method may include adjusting a transmitter current according to the request. For example, controller 114 (FIG. 1) may adjust the current of Tx resonator (FIG. 1) according to the voltage information in request 104 (FIG. 1), e.g., as described above.

As indicated by arrow 211, the method may include detecting the voltage level of the DC power signal, for example, after adjustment of the wireless charging signal. For example, bypass controller 154 (FIG. 1) may detect the voltage level of DC power signal 106 (FIG. 1), e.g., as described above.

Figure 3:
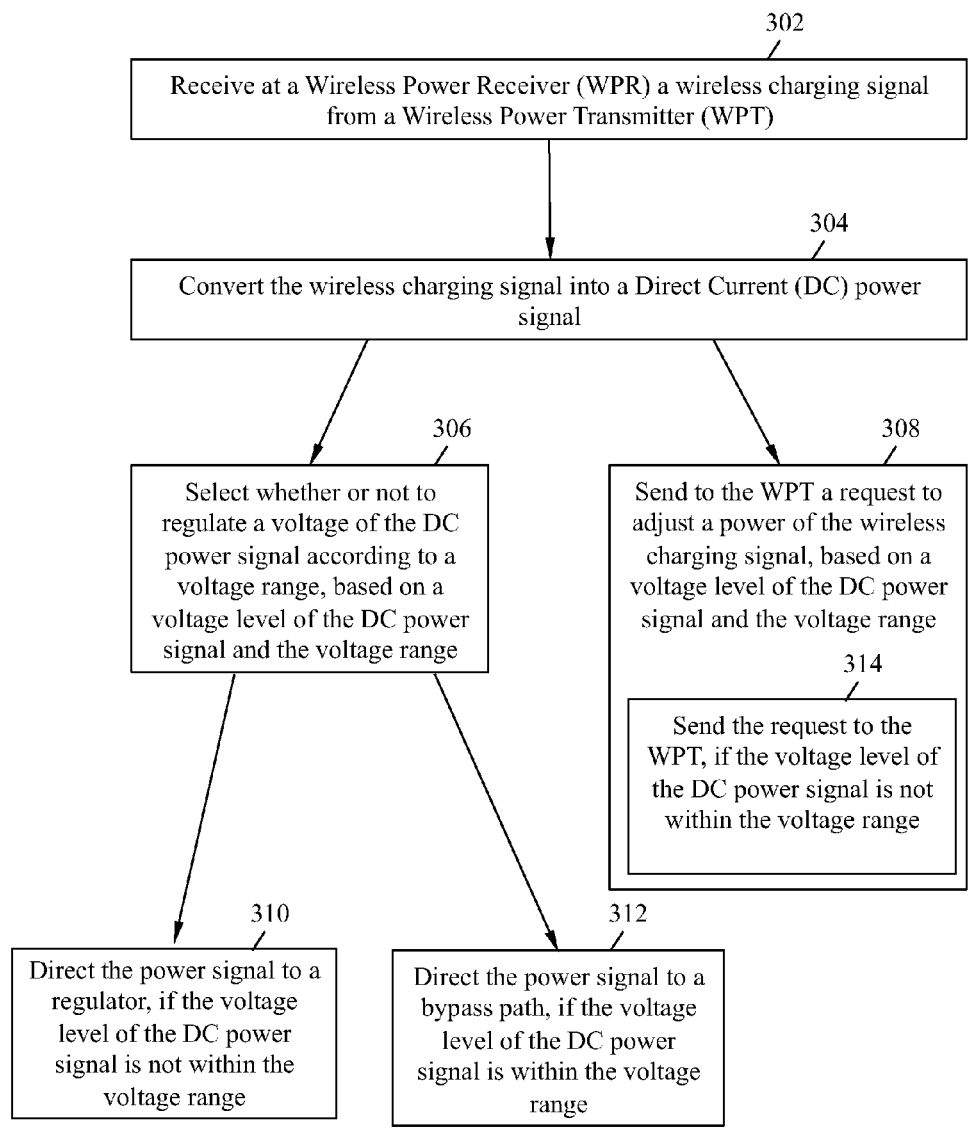
FIG. 3 is a schematic flow chart illustration of a method of a wireless power transfer, in accordance with some demonstrative embodiments.

Reference now is made to FIG. 3, which schematically illustrates a method of a wireless power transfer, in accordance with some demonstrative embodiments. For example, one or more of the operations of the method of FIG. 3 may be performed by a wireless charging system, e.g., system 100 (FIG. 1); a charging device, e.g., device 110 (FIG. 1); a rechargeable device, e.g., device 150 (FIG. 1); a wireless power receiver, e.g., WPR 152; and/or a bypass controller, e.g., bypass controller 154.

As indicated at block 302, the method may include receiving at a WPR a wireless charging signal from a WPT. For example, WPR 152 (FIG. 1) may receive wireless charging signal 102 (FIG. 1) from WPT 112 (FIG. 1), e.g., as described above.

As indicated at block 304, the method may include converting the wireless charging signal into a DC power signal. For example, rectifier 161 (FIG. 1) may convert wireless charging signal 102 (FIG. 1) into DC power signal 106 (FIG. 1), e.g., as described above.

As indicated at block 306, the method may include selecting whether or not to regulate a voltage of the DC power signal according to a voltage level of the DC power signal and a voltage range. For example, bypass controller 154 (FIG. 1) may select whether or not to regulate the voltage of DC power signal 106 (FIG. 1) according to the voltage level of DC power signal 106 (FIG. 1) and the voltage range, e.g., as described above.

As indicated at block 310, the method may include directing the power signal to a regulator, for example, if the voltage level of the DC power signal is not within the voltage range. For example, bypass controller 154 (FIG. 1) may direct the power signal to Rx voltage regulator 160 (FIG. 1), for example, if the voltage level of DC power signal 106 (FIG. 1) is not within the voltage range, e.g., as described above.

As indicated at block 312, the method may include directing the DC power signal to a bypass path, for example, if the voltage level of the DC power signal is within the voltage range. For example, bypass controller 154 (FIG. 1) may direct DC power signal 106 (FIG. 1) to bypass path 108 (FIG. 1), for example, if the voltage level of DC power signal 106 (FIG. 1) is within the voltage range, e.g., as described above.

As indicated at block 308, the method may include sending to the WPT a request to adjust a power of the wireless charging signal, based on the voltage level of the DC power signal and the voltage range. For example, bypass controller 154 (FIG. 1) may send to WPT 112 (FIG. 1) request 104 (FIG. 1) to adjust the power of wireless charging signal 102 (FIG. 1), based on a voltage level of DC power signal 106 (FIG. 1) and the voltage range, e.g., as described above.

As indicated at block 314, the method may include sending the request to the WPT, for example, if the voltage level of the DC power signal is not within the voltage range. For example, bypass controller 154 (FIG. 1) may send to WPT 112 (FIG. 1) request 104 (FIG. 1), for example, if the voltage level of DC power signal 106 (FIG. 1) is not within the voltage range, e.g., as described above.

Figure 4:
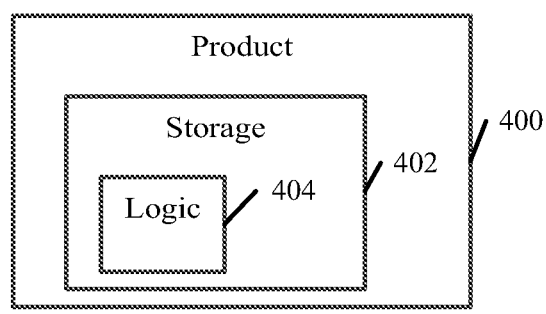
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of device 110 (FIG. 1), device 150 (FIG. 1), WPT 112 (FIG. 1), controller 114 (FIG. 1), WPR 152 (FIG. 1), bypass controller 154 (FIG. 1) and/or to perform one or more operations of the methods of FIG. 2 and/or 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a Wireless Power Receiver (WPR) to receive a wireless charging signal from a Wireless Power Transmitter (WPT), the WPR comprising a rectifier to convert the wireless charging signal into a Direct Current (DC) power signal; a voltage regulator to regulate a voltage of the DC power signal according to a voltage range; a bypass path to bypass the voltage regulator; and a bypass controller to select between directing the DC power signal to the regulator or to the bypass path, based on a voltage level of the DC power signal and the voltage range.

Example 2 includes the subject matter of Example 1, and optionally, wherein the bypass controller is to direct the DC power signal to the bypass path, if the voltage level of the DC power signal is within the voltage range.

Example 3 includes the subject matter of Example 1 or 2, and optionally, wherein the bypass controller is to direct the DC power signal to the regulator, if the voltage level of the DC power signal is not within the voltage range.

Example 4 includes the subject matter of any one of Examples 1-3, and optionally, wherein the bypass controller is to send to the WPT a request to adjust a power of the wireless charging signal, based on the voltage level and the voltage range.

Example 5 includes the subject matter of Example 4, and optionally, wherein the bypass controller is to send the request to the WPT, if the voltage level of the DC power signal is not within the voltage range.

Example 6 includes the subject matter of Example 4 or 5, and optionally, wherein the request comprises the voltage range.

Example 7 includes the subject matter of any one of Examples 4-6, and optionally, wherein the request comprises a request to decrease or to increase the power of the wireless charging signal.

Example 8 includes the subject matter of any one of Examples 4-7, and optionally, comprising a communication module to transmit the request to the WPT.

Example 9 includes the subject matter of Example 8, and optionally, wherein the communication module comprises a Bluetooth low energy (BLE) communication module.

Example 10 includes a Wireless Power Receiver (WPR) to receive a wireless charging signal from a Wireless Power Transmitter (WPT), the WPR comprising a rectifier to convert the wireless charging signal into a Direct Current (DC) power signal; and a controller to send to the WPT a request to adjust a power of the wireless charging signal, based on a voltage level of the DC power signal and a voltage range.

Example 11 includes the subject matter of Example 10, and optionally, wherein the controller is to send the request to the WPT, if the voltage level of the DC power signal is not within the voltage range.

Example 12 includes the subject matter of Example 10 or 11, and optionally, wherein the request comprises the voltage range.

Example 13 includes the subject matter of any one of Examples 10-12, and optionally, wherein the request comprises a request to decrease or to increase power of the wireless charging signal.

Example 14 includes the subject matter of any one of Examples 10-13, and optionally, comprising a voltage regulator to regulate a voltage of the DC power signal according to the voltage range; and a bypass path to bypass the voltage regulator, wherein the controller is to select between directing the DC power signal to the regulator or to the bypass path, based on the voltage level and the voltage range.

Example 15 includes the subject matter of Example 14, and optionally, wherein the controller is to direct the DC power signal to the bypass path, if the voltage level of the DC power signal is within the voltage range.

Example 16 includes the subject matter of Example 14 or 15, and optionally, wherein the controller is to direct the DC power signal to the regulator, if the voltage level of the DC power signal is not within the voltage range.

Example 17 includes the subject matter of any one of Examples 10-16, and optionally, comprising a communication module to transmit the request to the WPT.

Example 18 includes the subject matter of Example 17, and optionally, wherein the communication module comprises a Bluetooth low energy (BLE) communication module.

Example 19 includes a system comprising a battery; a battery charger; a Wireless Power Receiver (WPR) to receive from a Wireless Power Transmitter (WPT) a wireless charging signal to charge the battery, the WPR including a rectifier to convert the wireless charging signal into a Direct Current (DC) power signal; a voltage regulator to regulate a voltage of the DC power signal according to a voltage range; a bypass path to bypass the voltage regulator; and a bypass controller to select between directing the DC power signal to the regulator or to the bypass path, based on a voltage level of the DC power signal and the voltage range.

Example 20 includes the subject matter of Example 19, and optionally, wherein the bypass controller is to direct the DC power signal to the bypass path, if the voltage level of the DC power signal is within the voltage range.

Example 21 includes the subject matter of Example 19 or 20, and optionally, wherein the bypass controller is to direct the DC power signal to the regulator, if the voltage level of the DC power signal is not within the voltage range.

Example 22 includes the subject matter of any one of Examples 19-21, and optionally, wherein the bypass controller is to send to the WPT a request to adjust a power of the wireless charging signal, based on the voltage level and the voltage range.

Example 23 includes the subject matter of Example 22, and optionally, wherein the bypass controller is to send the request to the WPT, if the voltage level of the DC power signal is not within the voltage range.

Example 24 includes the subject matter of Example 22 or 23, and optionally, wherein the request comprises the voltage range.

Example 25 includes the subject matter of any one of Examples 22-24, and optionally, wherein the request comprises a request to decrease or to increase the power of the wireless charging signal.

Example 26 includes the subject matter of Examples 22-25, and optionally, wherein the WPR device comprises a communication module to transmit the request to the WPT.

Example 27 includes the subject matter of Example 26, and optionally, wherein the communication module comprises a Bluetooth low energy (BLE) communication module.

Example 28 includes a system comprising a battery; a battery charger; a Wireless Power Receiver (WPR) to receive from a Wireless Power Transmitter (WPT) a wireless charging signal to charge the battery, the WPR including a rectifier to convert the wireless charging signal into a Direct Current (DC) power signal; and a controller to send to the WPT a request to adjust a power of the wireless charging signal, based on a voltage level of the DC power signal and a voltage range.

Example 29 includes the subject matter of Example 28, and optionally, wherein the controller is to send the request to the WPT, if the voltage level of the DC power signal is not within the voltage range.

Example 30 includes the subject matter of Example 28 or 29, and optionally, wherein the request comprises the voltage range.

Example 31 includes the subject matter of any one of Examples 28-30, and optionally, wherein the request comprises a request to decrease or to increase power of the wireless charging signal.

Example 32 includes the subject matter of any one of Examples 28-31, and optionally, wherein the WPR device comprises a voltage regulator to regulate a voltage of the DC power signal according to the voltage range; and a bypass path to bypass the voltage regulator, wherein the controller is to select between directing the DC power signal to the regulator or to the bypass path, based on the voltage level and the voltage range.

Example 33 includes the subject matter of Example 32, and optionally, wherein the controller is to direct the DC power signal to the bypass path, if the voltage level of the DC power signal is within the voltage range.

Example 34 includes the subject matter of Example 32 or 33, and optionally, wherein the controller is to direct the DC power signal to the regulator, if the voltage level of the DC power signal is not within the voltage range.

Example 35 includes the subject matter of any one of Examples 28-34, and optionally, wherein the WPR device comprises a communication module to transmit the request to the WPT.

Example 36 includes the subject matter of Example 35, and optionally, wherein the communication module comprises a Bluetooth low energy (BLE) communication module.

Example 37 includes a method comprising receiving at a Wireless Power Receiver (WPR) a wireless charging signal from a Wireless Power Transmitter (WPT); converting the wireless charging signal into a Direct Current (DC) power signal; and selecting whether or not to regulate a voltage of the DC power signal according to a voltage range, based on a voltage level of the DC power signal and the voltage range.

Example 38 includes the subject matter of Example 37, and optionally, comprising directing the DC power signal to bypass a voltage regulator, if the voltage level of the DC power signal is within the voltage range.

Example 39 includes the subject matter of Example 37 or 38, and optionally, comprising directing the DC power signal to a voltage regulator, if the voltage level of the DC power signal is not within the voltage range.

Example 40 includes the subject matter of any one of Examples 37-39, and optionally, comprising sending to the WPT a request to adjust a power of the wireless charging signal, based on the voltage level and the voltage range.

Example 41 includes the subject matter of Example 40, and optionally, comprising sending the request to the WPT, if the voltage level of the DC power signal is not within the voltage range.

Example 42 includes the subject matter of Example 40 or 41, and optionally, wherein the request comprises the voltage range.

Example 43 includes the subject matter of any one of Examples 40-42, and optionally, wherein the request comprises a request to decrease or to increase the power of the wireless charging signal.

Example 44 includes the subject matter of any one of Examples 40-43, and optionally, comprising transmitting the request to the WPT via a wireless communication link.

Example 45 includes a method comprising receiving at a Wireless Power Receiver (WPR) a wireless charging signal from a Wireless Power Transmitter (WPT); converting the wireless charging signal into a Direct Current (DC) power signal; and sending to the WPT a request to adjust a power of the wireless charging signal, based on a voltage level of the DC power signal and a voltage range.

Example 46 includes the subject matter of Example 45, and optionally, comprising sending the request to the WPT, if the voltage level of the DC power signal is not within the voltage range.

Example 47 includes the subject matter of Example 45 or 46, and optionally, wherein the request comprises the voltage range.

Example 48 includes the subject matter of any one of Examples 45-47, and optionally, wherein the request comprises a request to decrease or to increase power of the wireless charging signal.

Example 49 includes the subject matter of any one of Examples 45-48, and optionally, comprising dynamically bypassing a voltage regulator of the WPR device based on the voltage level and the voltage range.

Example 50 includes the subject matter of Example 49, and optionally, comprising directing the DC power signal to bypass the voltage regulator, if the voltage level of the DC power signal is within the voltage range.

Example 51 includes the subject matter of Example 49 or 50, and optionally, comprising directing the DC power signal to the voltage regulator, if the voltage level of the DC power signal is not within the voltage range.

Example 52 includes the subject matter of any one of Examples 45-51, and optionally, comprising transmitting the request to the WPT via a wireless communication link.

Example 53 includes a product including one or more tangible computer-readable non-transitory storage media comprising computer-executable instructions operable to, when executed by at least one computer processor, enable the at least one computer processor to implement a method comprising receiving at a Wireless Power Receiver (WPR) a wireless charging signal from a Wireless Power Transmitter (WPT); converting the wireless charging signal into a Direct Current (DC) power signal; and selecting whether or not to regulate a voltage of the DC power signal according to a voltage range, based on a voltage level of the DC power signal and the voltage range.

Example 54 includes the subject matter of Example 53, and optionally, wherein the method comprises directing the DC power signal to bypass a voltage regulator, if the voltage level of the DC power signal is within the voltage range.

Example 55 includes the subject matter of Example 53 or 54, and optionally, wherein the method comprises directing the DC power signal to a voltage regulator, if the voltage level of the DC power signal is not within the voltage range.

Example 56 includes the subject matter of any one of Examples 53-55, and optionally, wherein the method comprises sending to the WPT a request to adjust a power of the wireless charging signal, based on the voltage level and the voltage range.

Example 57 includes the subject matter of Example 56, and optionally, wherein the method comprises sending the request to the WPT, if the voltage level of the DC power signal is not within the voltage range.

Example 58 includes the subject matter of Example 56 or 57, and optionally, wherein the request comprises the voltage range.

Example 59 includes the subject matter of any one of Examples 56-58, and optionally, wherein the request comprises a request to decrease or to increase the power of the wireless charging signal.

Example 60 includes the subject matter of any one of Examples 56-59, and optionally, wherein the method comprises transmitting the request to the WPT via a wireless communication link.

Example 61 includes a product including one or more tangible computer-readable non-transitory storage media comprising computer-executable instructions operable to, when executed by at least one computer processor, enable the at least one computer processor to implement a method comprising receiving at a Wireless Power Receiver (WPR) a wireless charging signal from a Wireless Power Transmitter (WPT); converting the wireless charging signal into a Direct Current (DC) power signal; and sending to the WPT a request to adjust a power of the wireless charging signal, based on a voltage level of the DC power signal and a voltage range.

Example 62 includes the subject matter of Example 61, and optionally, wherein the method comprises sending the request to the WPT, if the voltage level of the DC power signal is not within the voltage range.

Example 63 includes the subject matter of Example 61 or 62, and optionally, wherein the request comprises the voltage range.

Example 64 includes the subject matter of any one of Examples 61-63, and optionally, wherein the request comprises a request to decrease or to increase power of the wireless charging signal.

Example 65 includes the subject matter of any one of Examples 61-64, and optionally, wherein the method comprises dynamically bypassing a voltage regulator of the WPR device, based on the voltage level and the voltage range.

Example 66 includes the subject matter of Example 65, and optionally, wherein the method comprises directing the DC power signal to bypass the voltage regulator, if the voltage level of the DC power signal is within the voltage range.

Example 67 includes the subject matter of Example 65 or 66, and optionally, wherein the method comprises directing the DC power signal to the voltage regulator, if the voltage level of the DC power signal is not within the voltage range.

Example 68 includes the subject matter of any one of Examples 61-67, and optionally, wherein the method comprises transmitting the request to the WPT via a wireless communication link.

Example 69 includes an apparatus comprising means for receiving at a Wireless Power Receiver (WPR) a wireless charging signal from a Wireless Power Transmitter (WPT); means for converting the wireless charging signal into a Direct Current (DC) power signal; and means for selecting whether or not to regulate a voltage of the DC power signal according to a voltage range, based on a voltage level of the DC power signal and the voltage range.

Example 70 includes the subject matter of Example 69, and optionally, comprising means for directing the DC power signal to bypass a voltage regulator, if the voltage level of the DC power signal is within the voltage range.

Example 71 includes the subject matter of Example 69 or 70, and optionally, comprising means for directing the DC power signal to a voltage regulator, if the voltage level of the DC power signal is not within the voltage range.

Example 72 includes the subject matter of any one of Examples 69-71, and optionally, comprising means for sending to the WPT a request to adjust a power of the wireless charging signal, based on the voltage level and the voltage range.

Example 73 includes the subject matter of Example 72, and optionally, comprising means for sending the request to the WPT, if the voltage level of the DC power signal is not within the voltage range.

Example 74 includes the subject matter of Example 72 or 73, and optionally, wherein the request comprises the voltage range.

Example 75 includes the subject matter of any one of Examples 72-74, and optionally, wherein the request comprises a request to decrease or to increase the power of the wireless charging signal.

Example 76 includes the subject matter of any one of Examples 72-75, and optionally, comprising means for transmitting the request to the WPT via a wireless communication link.

Example 77 includes an apparatus comprising means for receiving at a Wireless Power Receiver (WPR) a wireless charging signal from a Wireless Power Transmitter (WPT); means for converting the wireless charging signal into a Direct Current (DC) power signal; and means for sending to the WPT a request to adjust a power of the wireless charging signal, based on a voltage level of the DC power signal and a voltage range.

Example 78 includes the subject matter of Example 77, and optionally, comprising means for sending the request to the WPT, if the voltage level of the DC power signal is not within the voltage range.

Example 79 includes the subject matter of Example 77 or 78, and optionally, wherein the request comprises the voltage range.

Example 80 includes the subject matter of any one of Examples 77-79, and optionally, wherein the request comprises a request to decrease or to increase power of the wireless charging signal.

Example 81 includes the subject matter of any one of Examples 77-80, and optionally, comprising means for dynamically bypassing a voltage regulator of the WPR device, based on the voltage level and the voltage range.

Example 82 includes the subject matter of Example 81, and optionally, comprising means for directing the DC power signal to bypass the voltage regulator, if the voltage level of the DC power signal is within the voltage range.

Example 83 includes the subject matter of Example 81 or 82, and optionally, comprising means for directing the DC power signal to the voltage regulator, if the voltage level of the DC power signal is not within the voltage range.

Example 84 includes the subject matter of any one of Examples 77-83, and optionally, comprising means for transmitting the request to the WPT via a wireless communication link.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A Wireless Power Receiver (WPR) to receive a wireless charging signal from a Wireless Power Transmitter (WPT), the WPR comprising:
    a rectifier to convert said wireless charging signal into a Direct Current (DC) power signal;
    a voltage regulator to regulate a voltage of said DC power signal according to a voltage range;
    a bypass path to bypass said voltage regulator; and
    a bypass controller to select between directing said DC power signal to said regulator or to said bypass path, based on a voltage level of said DC power signal and said voltage range.

2. The WPR of claim 1, wherein said bypass controller is to direct said DC power signal to said bypass path, if the voltage level of said DC power signal is within said voltage range.

3. The WPR of claim 1, wherein said bypass controller is to direct said DC power signal to said regulator, if the voltage level of said DC power signal is not within said voltage range.

4. The WPR of claim 1, wherein said bypass controller is to send to said WPT a request to adjust a power of said wireless charging signal, based on said voltage level and said voltage range.

5. The WPR of claim 4, wherein said bypass controller is to send said request to the WPT, if the voltage level of said DC power signal is not within said voltage range.

6. The WPR of claim 4, wherein said request comprises said voltage range.

7. The WPR of claim 4, wherein said request comprises a request to decrease or to increase the power of said wireless charging signal.

8. The WPR of claim 4 comprising a communication module to transmit said request to said WPT.

9. The WPR of claim 8, wherein said communication module comprises a Bluetooth low energy (BLE) communication module.

10. A system comprising:
    a battery;
    a battery charger;
    a Wireless Power Receiver (WPR) to receive from a Wireless Power Transmitter (WPT) a wireless charging signal to charge said battery, the WPR including:
        a rectifier to convert said wireless charging signal into a Direct Current (DC) power signal;
        a voltage regulator to regulate a voltage of said DC power signal according to a voltage range;
        a bypass path to bypass said voltage regulator; and
        a bypass controller to select between directing said DC power signal to said regulator or to said bypass path, based on a voltage level of said DC power signal and said voltage range.

11. The system of claim 10, wherein said bypass controller is to direct said DC power signal to said bypass path, if the voltage level of said DC power signal is within said voltage range.

12. The system of claim 10, wherein said bypass controller is to direct said DC power signal to said regulator, if the voltage level of said DC power signal is not within said voltage range.

13. The system of claim 10, wherein said bypass controller is to send to said WPT a request to adjust a power of said wireless charging signal, based on said voltage level and said voltage range.

14. The system of claim 13, wherein said bypass controller is to send said request to the WPT, if the voltage level of said DC power signal is not within said voltage range.

15. The system of claim 13, wherein said WPR device comprises a communication module to transmit said request to said WPT.

16. A method comprising:
    receiving at a Wireless Power Receiver (WPR) a wireless charging signal from a Wireless Power Transmitter (WPT);
    converting said wireless charging signal into a Direct Current (DC) power signal; and
    selecting whether or not to regulate a voltage of said DC power signal according to a voltage range, based on a voltage level of said DC power signal and said voltage range.

17. The method of claim 16 comprising directing said DC power signal to bypass a voltage regulator, if the voltage level of said DC power signal is within said voltage range.

18. The method of claim 16 comprising directing said DC power signal to a voltage regulator, if the voltage level of said DC power signal is not within said voltage range.

19. The method of claim 16 comprising sending to said WPT a request to adjust a power of said wireless charging signal, based on said voltage level and said voltage range.

20. The method of claim 19 comprising sending said request to the WPT, if the voltage level of said DC power signal is not within said voltage range.

21. A product including one or more tangible computer-readable non-transitory storage media comprising computer-executable instructions operable to, when executed by at least one computer processor, enable the at least one computer processor to implement a method comprising:
    receiving at a Wireless Power Receiver (WPR) a wireless charging signal from a Wireless Power Transmitter (WPT);
    converting said wireless charging signal into a Direct Current (DC) power signal; and
    selecting whether or not to regulate a voltage of said DC power signal according to a voltage range, based on a voltage level of said DC power signal and said voltage range.

22. The product of claim 21, wherein said method comprises directing said DC power signal to bypass a voltage regulator, if the voltage level of said DC power signal is within said voltage range.

23. The product of claim 21, wherein said method comprises directing said DC power signal to a voltage regulator, if the voltage level of said DC power signal is not within said voltage range.

24. The product of claim 21, wherein said method comprises sending to said WPT a request to adjust a power of said wireless charging signal, based on said voltage level and said voltage range.

25. The product of claim 24, wherein said method comprises sending said request to the WPT, if the voltage level of said DC power signal is not within said voltage range.

\* \* \* \* \*